Sheet 1 – 3 Sheets

H. A. Wells.

Forming Bals.

No. 1318.

Reissued Jun 17, 1862

Witnesses.

George Colyer

Robert Lamb

Inventor

H. A. Wells

H. A. Wells

Forming Bales.

No. 1318 Reissued Jun. 17, 1862.

Witnesses.

George Colyer

Robert Knox

Inventor.

H. A. Wells

H. A. Wells.
Forming Bats.

No. 1318

Reissued Jun. 17, 1862.

Witnesses.

Geo. Cobyn

Inventor.

H. A. Wells

UNITED STATES PATENT OFFICE.

HENRY A. BURR, OF NEW YORK, N. Y., ASSIGNEE, BY MESNE ASSIGMENTS OF HENRY A. WELLS, DECEASED.

IMPROVEMENT IN MANUFACTURING HAT-BODIES.

Specification forming part of Letters Patent No. 4,472, dated April 25, 1846; Reissue No. 400, dated October 7, 1856; Reissue No. 1,086, dated December 4, 1860; Reissue No. 1,318, dated June 17, 1862.

*To all whom it may concern:*

Be it known that HENRY A. WELLS, late of the city, county, and State of New York, now deceased, did, in his life-time, invent certain new and useful Improvements in the Process of and Machinery for Making Hat-Bodies of Fur, for which said improvements Letters Patent of the United States were granted to the said WELLS, bearing date the 25th day of April, 1846; and that the following is a full, clear, and exact description of the said new process, and of the manner of performing the same, reference being had to the accompanying drawings, making part of this description, in which—

Figure 1:
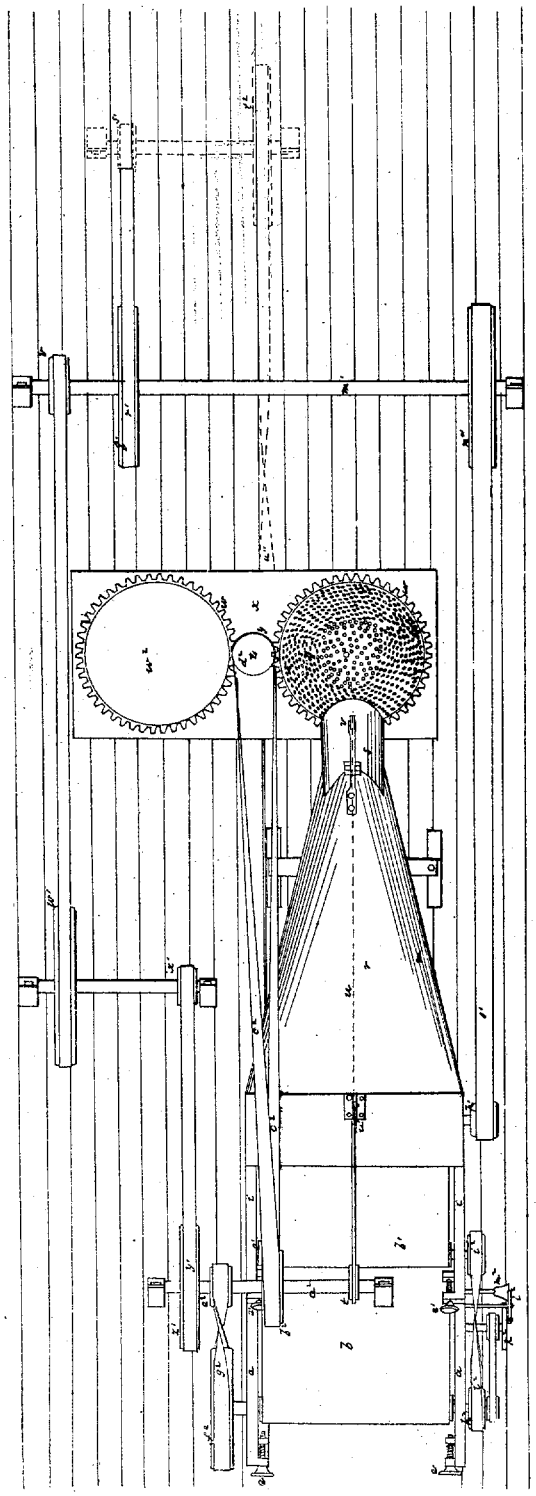
Figure 2:
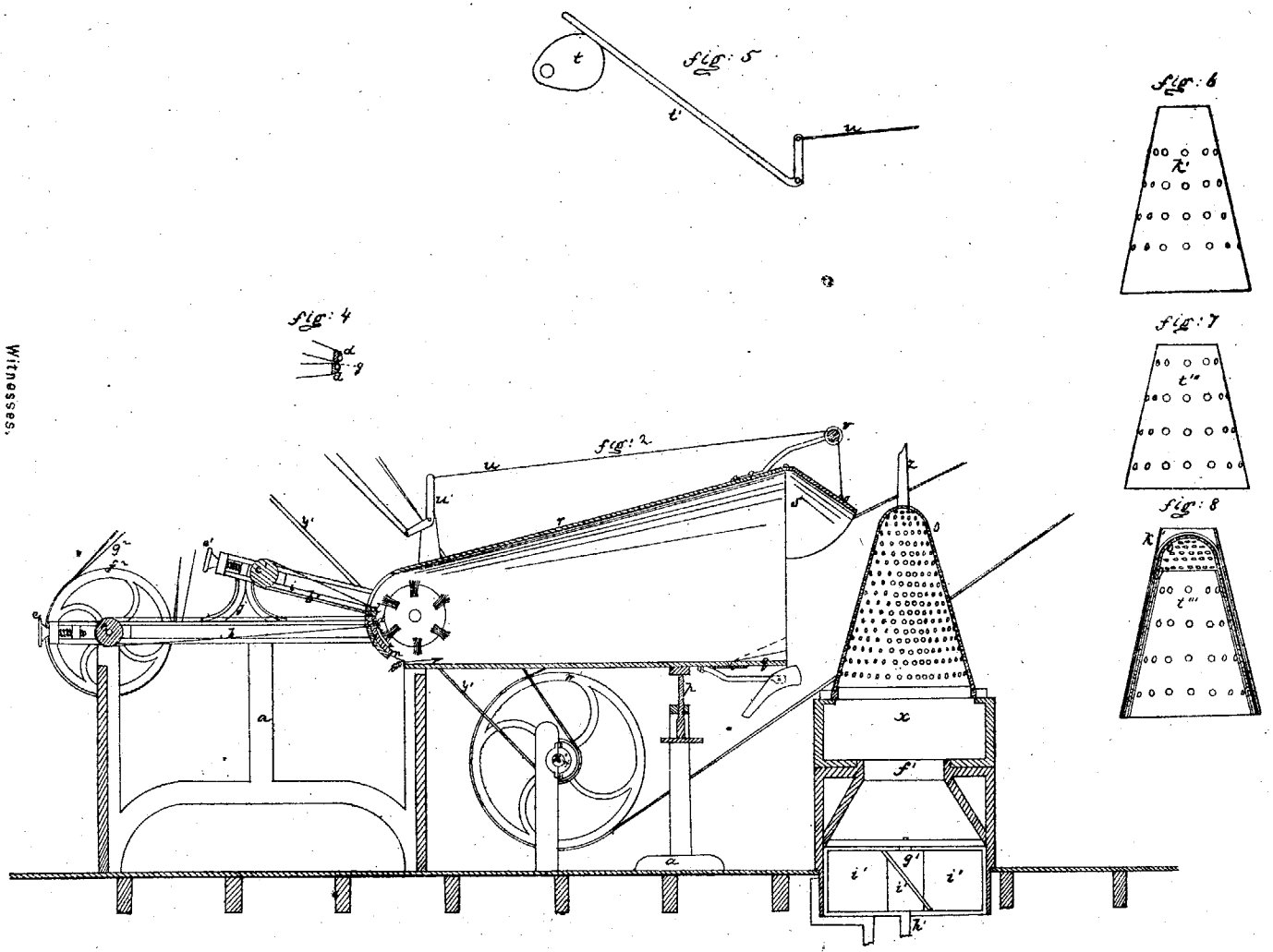
Figure 3:
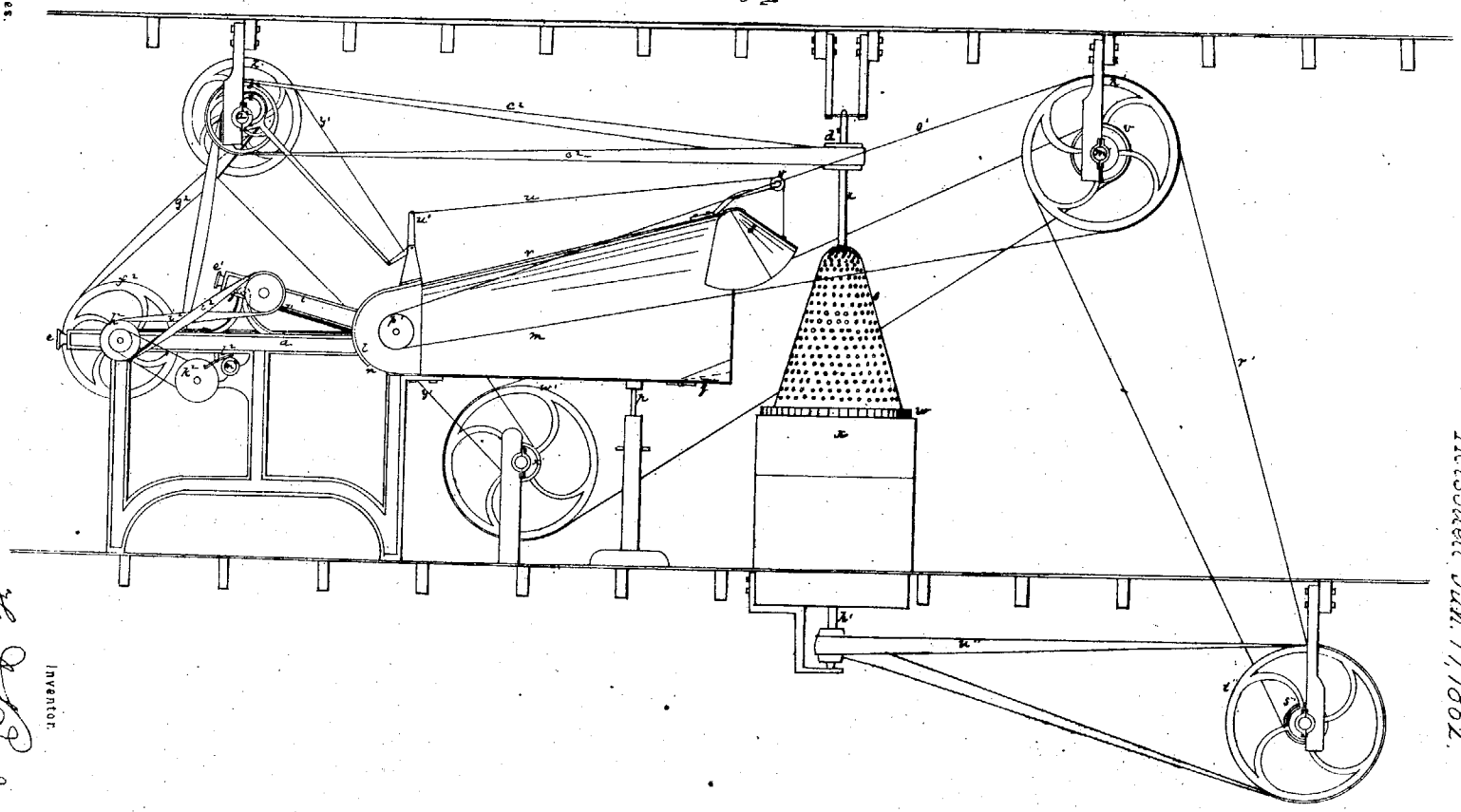

Figure 1 is a plan of an apparatus proper for performing part of the process; Fig. 2, a longitudinal, vertical section, and Fig. 3 a longitudinal elevation of the same. The other figures will be described in their appropriate places.

The same letters indicate like parts in all the figures.

A fur hat-body, as required by the hat-maker, is a conical or conoidal bat of fur, thick at that part thereof which is to constitute the brim of the hat manufactured therefrom, and thinner at that part which constitute the tip and crown of the finished hat. It is not a conical bat of fur of equal thickness throughout, or thick near the top of the cone and thin at its edges, or of indiscriminately varied thickness, but must have the variation of thickness above stated, disposed in the bat as described, so that the hat made therefrom shall combine strength with lightness, being strong at places where strength is needed, and comparatively light at those points where but little strength is required. By this disposition or distribution of the fur economy is also secured, as no more fur is used in any part than the exigencies of that part require. These bats must also have sufficient consistency or hardness so that they may be handled, may be, if necessary, transported from place to place, and be in such a state that they are fit for the subsequent process of felting, commonly known as "sizing."

A fur hat-body, as required by hat-makers, is therefore a hardened conoidal bat, in which the fur is disposed or distributed with varying thickness, as before described, and which has sufficient consistency to admit of its being handled and carried about; and the object of the said WELLS' invention was to produce such a hat-body, and the part of his invention herein specifically described is the process by which such a hat-body was formed, and this process consists of three steps—viz.: First, the deposition of fur fibers in varied thicknesses, as described, in a conoidal bat; second, the holding of the bat of fibers so as to preserve the disposition of the fur and permit the percolation of water; and third, the saturation of the bat with water, so as to harden it, all these steps being performed substantially as hereinafter set forth, and I will now proceed to describe this process and the apparatus devised by WELLS, and used by him in performing the same.

This apparatus is made up of certain parts, viz: A feeding apparatus, a nipping apparatus, a rotating fur-picking, or separating and throwing apparatus, an apparatus for directing the fur fibers toward the cone and distributing them so that the bat shall have the essential relative thickness in different parts before described, a perforated cone or former, an apparatus for inducing currents of air through the perforations of the cone, a contrivance for holding the bat thereon after it is deposited, and while it is being saturated, and a receptacle of water or proper apparatus for saturating the bat with water.

In the accompanying drawings, *a* is a frame supporting some of the operative parts of the machine, and *b* the lower feed-apron, on which the stock is spread by the attendant, in separate parcels, each sufficient for the formation of a hat according to its intended weight. This apron or endless belt of cloth, or other suitable material, passes around a roller, *c*, and a lip, *d*, the former at the back of the machine, with its bearings in sliding boxes governed by set-screws *e e*, for the purpose of tightening the apron, and the latter near to a rotating brush, *f*, and so formed as to present a slightly-rounded edge for the apron to pass over where it presents the fur to the action of the brush. Instead of this slightly-rounded edge, a small metallic roller may be substituted; but when this is done the roller should be supported at different points between its end journals, and this he effected by letting it run in a circular groove in the lip, as represented in section at Fig. 4, where *g* indicates this roller. The fur, as it is carried along toward the lip *d*, is gradually compressed by the upper apron, *b'*, which passes around a feed-roller, *c'*, and lip *d'*, in manner similar to the under feed-apron. The roller *c* runs in a frame, *i*, of which the lip *d'* forms part, hung on journals that rest in standards *j*, so that the lip *d'* can be made to press onto the fur between it and the under lip, *d*, and thus grip the fibers and present them to the effective action of the brush *f*. The under plane of the upper apron, *b'*, is inclined to the upper plane of the lower one, *b*, the more effectually to present the fibers in the proper manner to the brush. The roller *c'* of the upper apron runs in sliding boxes, governed by set-screws *e' e'*, and is placed forward of the journals of the frame, so that the tension of the belt $i^2$, which communicates motion from the lower roller, *c*, to the upper one, *c'*, may press the upper lip, *d'*, on the under lip, *d*, but this may be effected by means of springs, weights, or other well-known mechanical devices for making pressure under similar circumstances. These aprons and lips or their equivalents are the feeding and nipping apparatus used by WELLS. The fibers, as they pass from the feed-aprons, are acted upon by a brush, *f*, that rotates with great velocity, and which is composed of parallel rows of stiff bristles projecting from a cylinder, but which may be differently constructed and composed, if desired. As the fibers are first presented they are separated from each other by the downward action of the brush, as indicated by the arrow, and are carried down the curved surface *l*, and at the lower edge of this they are thrown off by the brush, meeting as they are impelled a current of air, (that enters a narrow aperture, *n*, near the bottom of the chamber, and extending the whole length of the brush,) which, being induced by the rotation of the brush and the partial vacuum in a perforated cone, prevents the fibers of fur from falling and aids in carrying them onto the perforated cone *o*. The brush is the rotating fur-separating and fur-throwing apparatus.

A chamber or tunnel, *m*, extends over and under the brush and the forward part of the lips and turns on the journals of the brush, or is otherwise so arranged as to have a slight motion up and down. Its bottom rests on a set-screw, *p*, to regulate the delivery end of the chamber relatively to the cone. This chamber is, at its rear end, as wide as the brush, and its top *r* is gradually elevated and sides contracted to make the delivery-aperture nearly of the form of the cone on which the bat is to be formed, but narrower and higher. The action of the part of this chamber in front of the brush in connection with that of the brush itself and the current of air before described causes the fur fibers to be distributed in unequal thickness upon the different parts of the cone, substantially as before described, and that part of the trunk which is effective in directing and distributing the fibers is the directing and distributing apparatus.

The forward end of the tunnel or trunk is provided with a hinged flap, *q*, regulated by a cam-lever as a means of diversifying the distribution of the fibers about the lower end of the cone, and at its upper end with a hood, *s*, so curved as to correspond generally with the tip of the cone. This hood is hinged to the upper part of the delivery-aperture of the chamber, and is connected with an eccentric, *t*, by means of a bell-crank, *u'*, and a cord, *u*, that passes over a pulley, *v*, so that each revolution of this eccentric carries the hood up and down, thus diversifying the distribution of the fibers about the tip of the cone; and when it is desired still further to diversify the distribution of the fibers, a cam can be substituted for the eccentric, and the connection between it and the hood is formed, as represented in section at Fig. 5, where the cam *t* acts on a lever, *l'*, connected with the hood *s* by a cord, *u*. The hood may also be operated by hand.

The cone *o* is made of thin sheet metal, perforated. Its lower edge fits in a metallic ring, *w*, that runs in an appropriate collar in the upper part of a case, *x*, and its outer periphery is provided with cogs that mesh into the cogs of a pinion, *y*, concealed in the drawings by the pulley $d^2$ on a vertical shaft, *z*, by which a slow rotary motion is given to the cone as the fibers are thrown onto it, to distribute them equally all around the cone. The case *x* is sufficiently long to receive two rings, *w*—one on each side of the pinion *y*—by which both are kept in motion, and it (the case) is made to swivel on a hollow collar, *f'*, to which its bottom is fitted, so that when one cone is covered it may be turned aside by turning the case half a revolution, and another cone put onto the other ring that another bat may be in the process of forming, while the one already formed may be prepared for the hardening process in the manner to be hereinafter described. The fibers issuing from the tunnel are deposited upon the cone, and are held upon it by currents of air entering the perforations, the revolution of the cone causing the deposit at any one height to be equal in thickness all around the cone. The cone opposite the end of the directing and distributing apparatus, and on which the bat is formed, is the perforated cone or former employed in the process of making that bat.

The case *x* communicates through the hollow collar *f'* with an exhausting fan-blower, *g'*, which consists of a vertical arbor, *h'*, with oblique vanes *i'*, so that when rotating with great velocity in the direction of the arrow the air is exhausted from the case *x* and the perforated cone *o*. When one of the cones is removed from one of the rings, *w*, to be taken to the hardening apparatus, the aperture in the ring *w* must be closed up with a cap-plate, $w^2$, to prevent the access of air. This blower is the apparatus for inducing currents of air through the perforations of the cone. Any other mode of exhausting the case and cone may be employed, but this is the most efficient which he (WELLS) essayed.

The preparation of the formed bat for hardening is effected by covering it with pieces of cloth just taken from hot water, and this is done in the following manner—viz.: The attendant takes from a kettle of hot water a piece of cloth rolled upon a roller, and applies one end of it to the surface of the bat, and as the cone rotates the cloth winds from the roller onto the bat on the cone. Another piece of cloth is put on the top, and then a strong perforated metallic cone, $k'$, (see Fig. 6,) is put over the whole, the more effectually to hold the fibers of the bat and to make a slight pressure on them while it is immersed in hot water to harden. As the perforated cone $o$ is better when made very thin, the pressure of the water when drawing it out of the kettle after the bat has been hardened tends to and would collapse it; and, therefore, to prevent this another perforated metallic cone, $t'''$, (see Fig. 7,) is put inside (before the whole is immersed in hot water) to sustain the pressure in drawing the whole out of the hardening-kettle. The relative situation of the three cones, the bat, and the covering cloth, preparatory to the hardening process, is represented on an enlarged scale at Fig. 8, which is a vertical section through the whole. The inner sustaining-cone may be dispensed with, if desired, by making the cone $o$ of greater thickness and strength The pieces of cloth and the outer cone are the contrivance used by WELLS for preserving the disposition of the fur in the bat after it is formed and while being saturated with water so as to harden it.

A proper kettle or receptacle for water was used in carrying out the process, and the bat, while on the cone, was immersed in and withdrawn from this receptacle, thus saturating it with water, and the water used was hot; and the gist of this part of the process is the saturation of the bat by water, which hardens it so as to give it consistency.

All the operative parts of the apparatus may be set in motion by any of the known means—such as belts—as fully represented in the accompanying drawings, in which $m'$ is a main line-shaft overhead, driven by any fast mover. From a wheel, $n'$, on it a band, $o'$, extends to a pulley, $p'$, on the shaft of the brush, which should make about two thousand revolutions per minute, more or less. From another wheel, $q'$, on this same shaft, a band, $r'$, extends to a pulley, $s'$, on the shaft of which there is a wheel, $t''$, that drives the exhaust-fan $g'$ by the belt $w''$; and from a pulley, $v'$, on the same line-shaft, a belt extends to a wheel, $w'$, on the shaft of which there is a pulley, $x'$, from which extends another belt, $y'$, to a wheel, $z'$, on the shaft $a^2$ that carries the eccentric $t$ to give all the reduced motions required for the other parts of the machinery. From a wheel, $b^2$, on this shaft, a belt, $c^2$, extends to a pulley, $d^2$, on the shaft Z, that rotates the cone $o$, and another pulley, $e^2$, drives the wheel $f^2$ of the feed-roller $c$ by the belt $g^2$, and on the other end of the axle of this feed-roller there is a pulley, $h^2$, which drives by a cross-belt, $i^2$, the upper feed-roller, $c'$. If desired, an alarm can be connected with the feed-roller of the lower apron to announce to the attendant when each charge of stock is exhausted, that the cones may be shifted. This can be done by connecting the arbor of the feed-roller $c$ of the lower feed-apron by a belt with a wheel, $k^2$, provided with a cam or pin to lift at every revolution the hammer $l^2$ of a belt, $m^2$, the striking of which shall give requisite indication.

In performing the process of WELLS', the steps are, first, the fur fibers are deposited upon a perforated cone with the essential relative thickness of fur in various parts thereof, before described, the distinguishing and essential characteristic of this part of the process being the disposition of a conical bat thick at that part which is to form the brim and thin at the tip, as before described; second, the bat is secured by pressure, the subjecting it to pressure so as to preserve the disposition of the fibers and permit the percolation of water being the essence of this part of the process; third, the bat thus secured is saturated with water, the essential characteristic of this part of the process being saturation with water to harden the bat so that it may be safely removed from the cone and be in such a state that it can afterward be subjected to the process of sizing. After saturation the bat is removed from the cone by first taking off the outer cone, then the covering cloth, and finally withdrawing the bat from the cone on which it was formed, the most convenient way of doing this being to invert the cone and then slip the bat off of it. When all these steps are performed, there results a conical or conoidal bat, thick at those parts which are to form the brim, and thin comparatively at those points which are to form the crown and tip of the finished hat, and with the fur therein so hardened that it may be handled as required, and which is in a fit state for the subsequent process of sizing, and the completed conoidal bat having these characteristics is a hat body, the thing which is produced by the new process, hereinbefore described.

Certain parts and combination of the apparatus, herein described, and useful in performing this process, were invented by WELLS, but are not claimed in this, but in another, patent, the process herein claimed being irrespective of the apparatus employed. Neither are any of the steps, or any parts of any step of this process claimed as new by themselves, but only the combination thereof as a complete process or whole producing the specified result.

What is claimed as the invention of the said HENRY A. WELLS, deceased, in this Patent is--

The compound process, herein described, for producing a hardened hat-body of varying thickness in different parts, substantially such as described, said compound process consisting, first, in depositing fur in a conical bat of the before-described varying thickness; second, in holding the bat by pressure so as to preserve the disposition of the fur and permit the percolation of water; and, third, in saturating the bat with water while the disposition of the fibers is preserved, these three steps being performed in the order and substantially in the manner as specified.

H. A. BURR.

Witnesses:
GEORGE COLYER,
ROBERT KNOX.